United States Patent
Espinasse et al.

(10) Patent No.: US 6,668,867 B2
(45) Date of Patent: Dec. 30, 2003

(54) FLEXIBLE METAL TUBE WITH CLOSED SECTION AND FLEXIBLE PIPE COMPRISING SAME

(75) Inventors: Philippe Espinasse, Bihorel (FR); Patrice Joël Louis Jung, La Mailleraye sur Seine (FR); Daniel Averbuch, Rueil-Malmaison (FR); François Dupoiron, Barentin (FR)

(73) Assignee: Institut Francais du Petrole & Coflexip (FR)

( * ) Notice: Subject to any disclaimer, the term of this patent is extended or adjusted under 35 U.S.C. 154(b) by 63 days.

(21) Appl. No.: 10/019,621

(22) PCT Filed: Apr. 18, 2001

(86) PCT No.: PCT/FR01/01188
§ 371 (c)(1),
(2), (4) Date: Dec. 20, 2001

(87) PCT Pub. No.: WO01/81810
PCT Pub. Date: Nov. 1, 2001

(65) Prior Publication Data
US 2003/0070719 A1 Apr. 17, 2003

(51) Int. Cl.[7] .................................................. F16L 11/16
(52) U.S. Cl. ........................ 138/135; 138/136; 138/138
(58) Field of Search ................. 138/136, 135, 138/138, 129

(56) References Cited

U.S. PATENT DOCUMENTS

| | | | | | |
|---|---|---|---|---|---|
| 714,332 | A | * | 11/1902 | Rudolph ..................... | 138/136 |
| 916,890 | A | * | 3/1909 | Rubes ........................ | 138/131 |
| 2,402,497 | A | * | 6/1946 | Johnson ..................... | 138/135 |
| 4,129,152 | A | * | 12/1978 | Davis .......................... | 138/154 |
| 4,630,650 | A | | 12/1986 | Davis | |
| 4,838,317 | A | * | 6/1989 | Andre et al. ................ | 138/135 |
| 4,862,924 | A | * | 9/1989 | Kanao ........................ | 138/144 |
| 4,964,440 | A | * | 10/1990 | Andre et al. ................ | 138/122 |
| 5,269,349 | A | * | 12/1993 | Sugier et al. ............... | 138/172 |
| 5,601,893 | A | * | 2/1997 | Strassel et al. ............. | 138/120 |
| 5,669,420 | A | * | 9/1997 | Herrero et al. ............. | 138/135 |
| 5,758,695 | A | * | 6/1998 | Carson ....................... | 138/154 |
| 6,024,135 | A | | 2/2000 | Nobileau | |
| 6,338,365 | B1 | * | 1/2002 | Odru .......................... | 138/134 |
| 6,415,825 | B1 | * | 7/2002 | Dupoiron et al. ........... | 138/127 |
| 6,488,052 | B2 | * | 12/2002 | Hupertz et al. ............. | 138/135 |
| 2002/0129862 | A1 | * | 9/2002 | Hupertz ...................... | 138/129 |

FOREIGN PATENT DOCUMENTS

FR 2665237 1/1992

OTHER PUBLICATIONS

International Search Report mailed Aug. 6, 2001 for Intl. Application No. PCT/FR01/01188.

* cited by examiner

Primary Examiner—James Hook
(74) Attorney, Agent, or Firm—Ostrolenk, Faber, Gerb & Soffen, LLP

(57) ABSTRACT

A flexible metal tube with closed section and a flexible pipe comprising such a metal tube, comprising a strip with substantially constant thickness and wound helically around an axis, the strip includes at least a closed section having walls formed by portions of a common turn of the strip, the closed section includes an upper wall and a lower wall and the section is arranged at one end of said strip while the other end terminates in a free edge. The closed section is trapezoidal in cross-section. A bulge radially oriented towards the upper wall of the closed section is provided between the closed section and the free edge of the stirrup. The invention is in particular applicable to flexible tubular pipes.

20 Claims, 7 Drawing Sheets

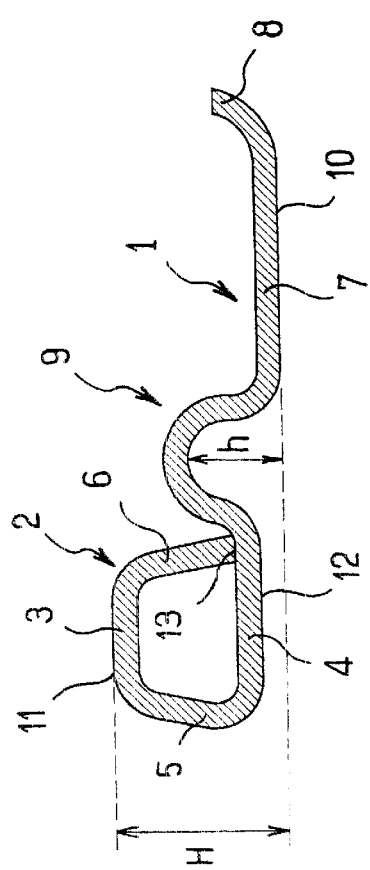
FIG_1
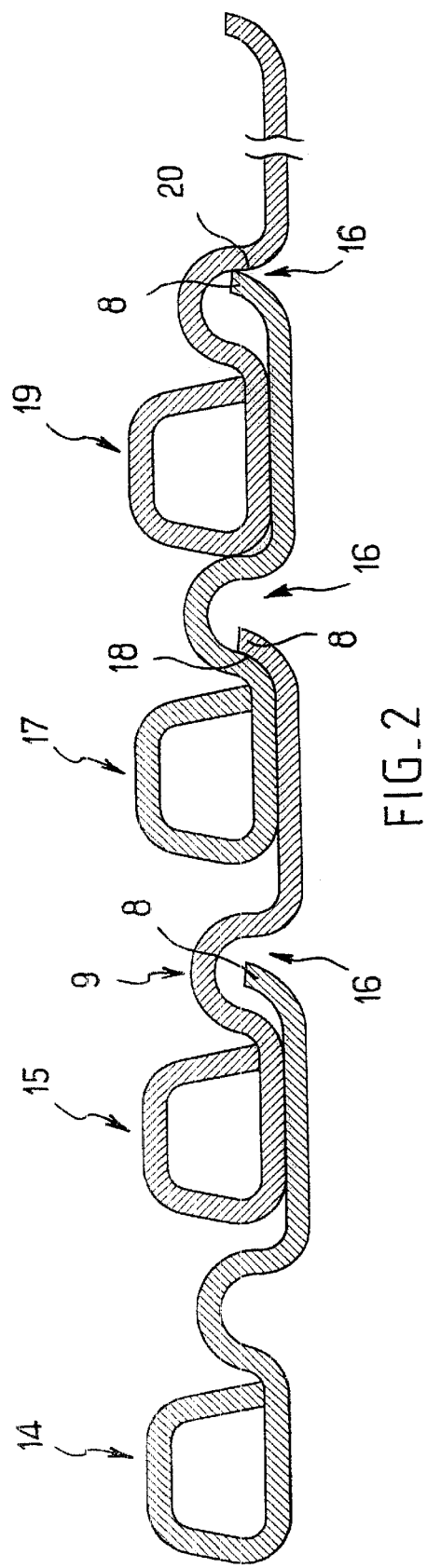
FIG_2

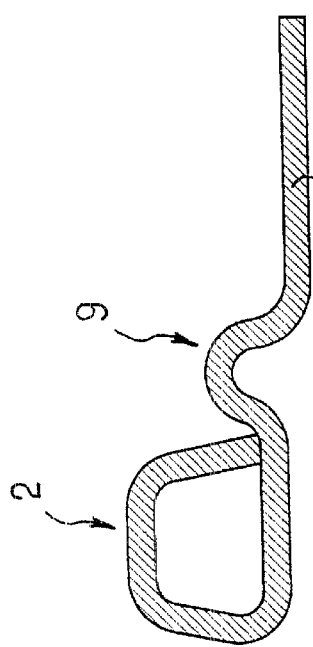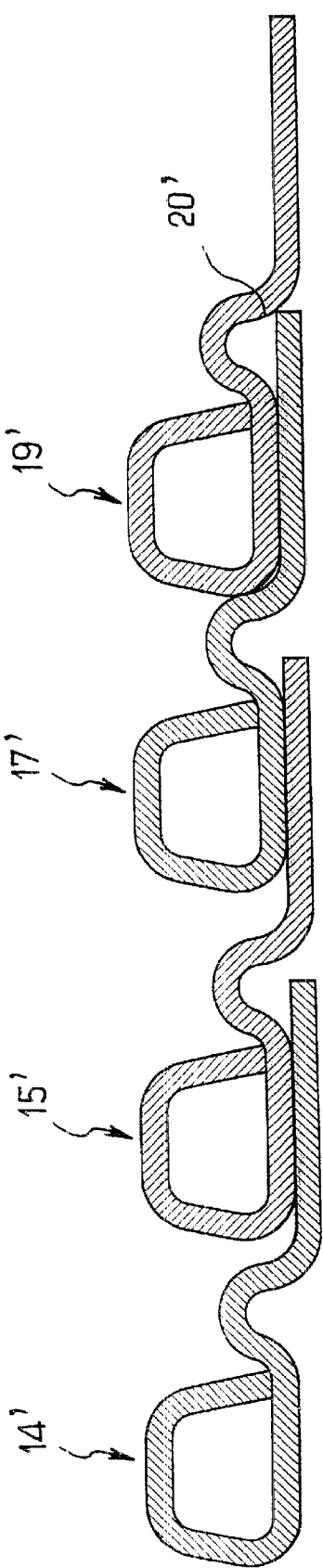

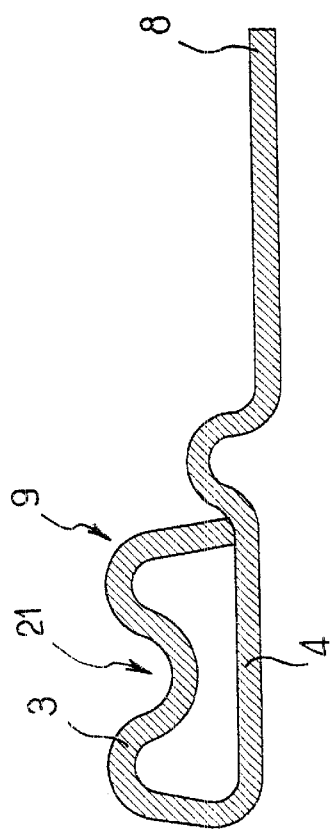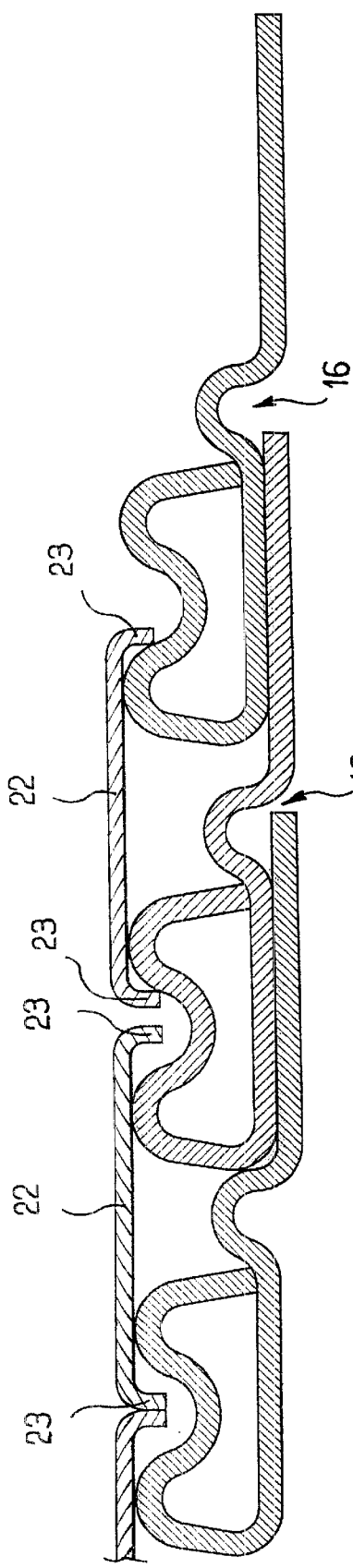

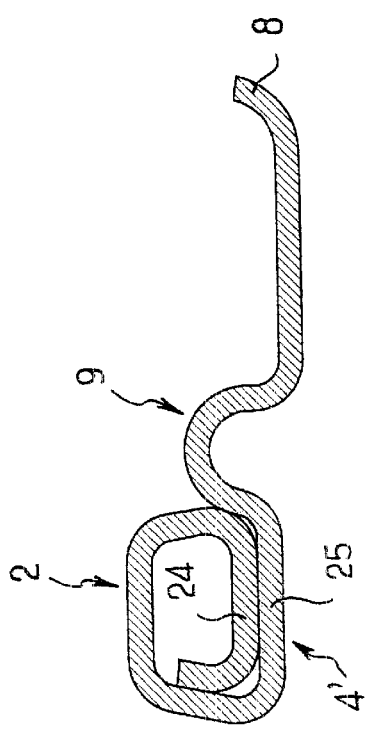
FIG._7
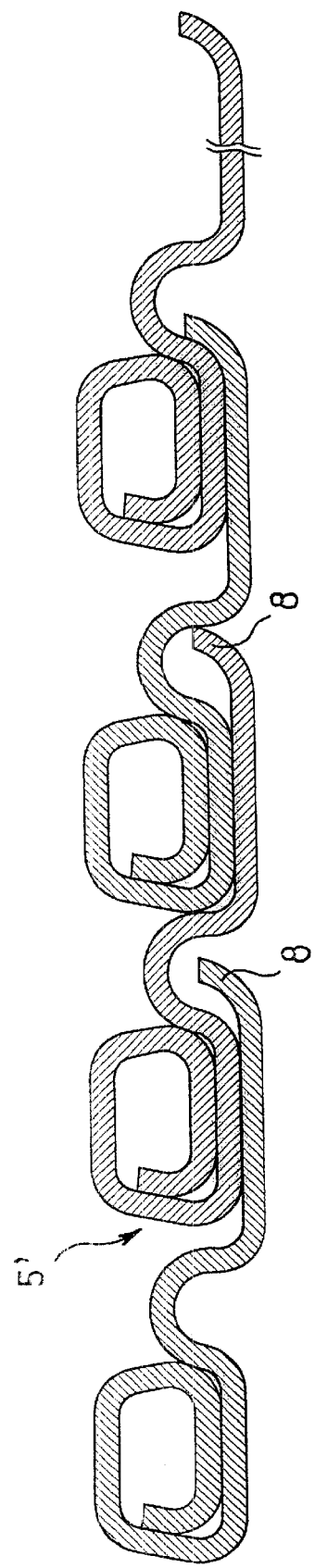
FIG._8

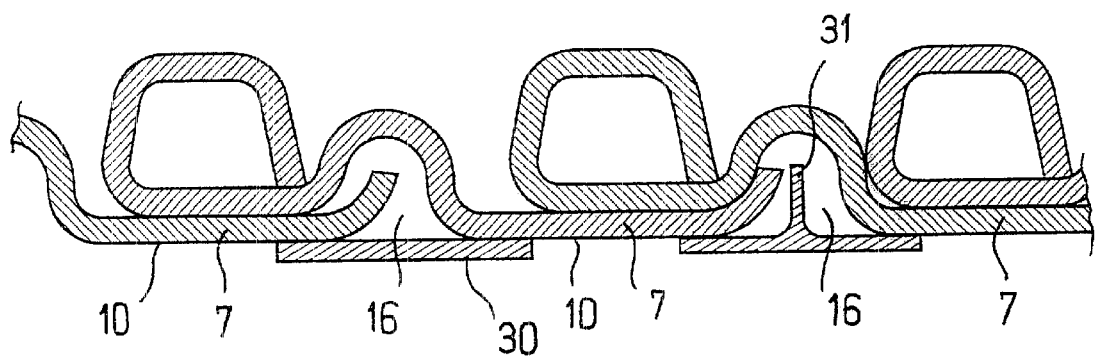
FIG_9
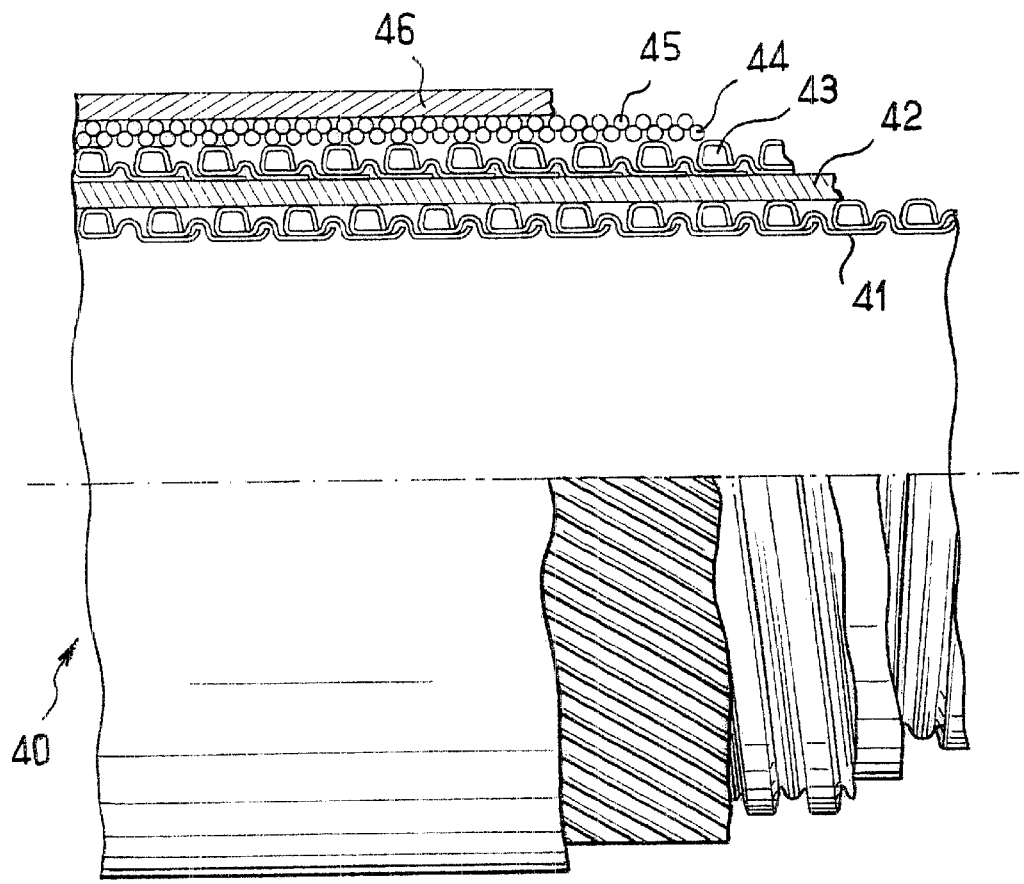
FIG_10

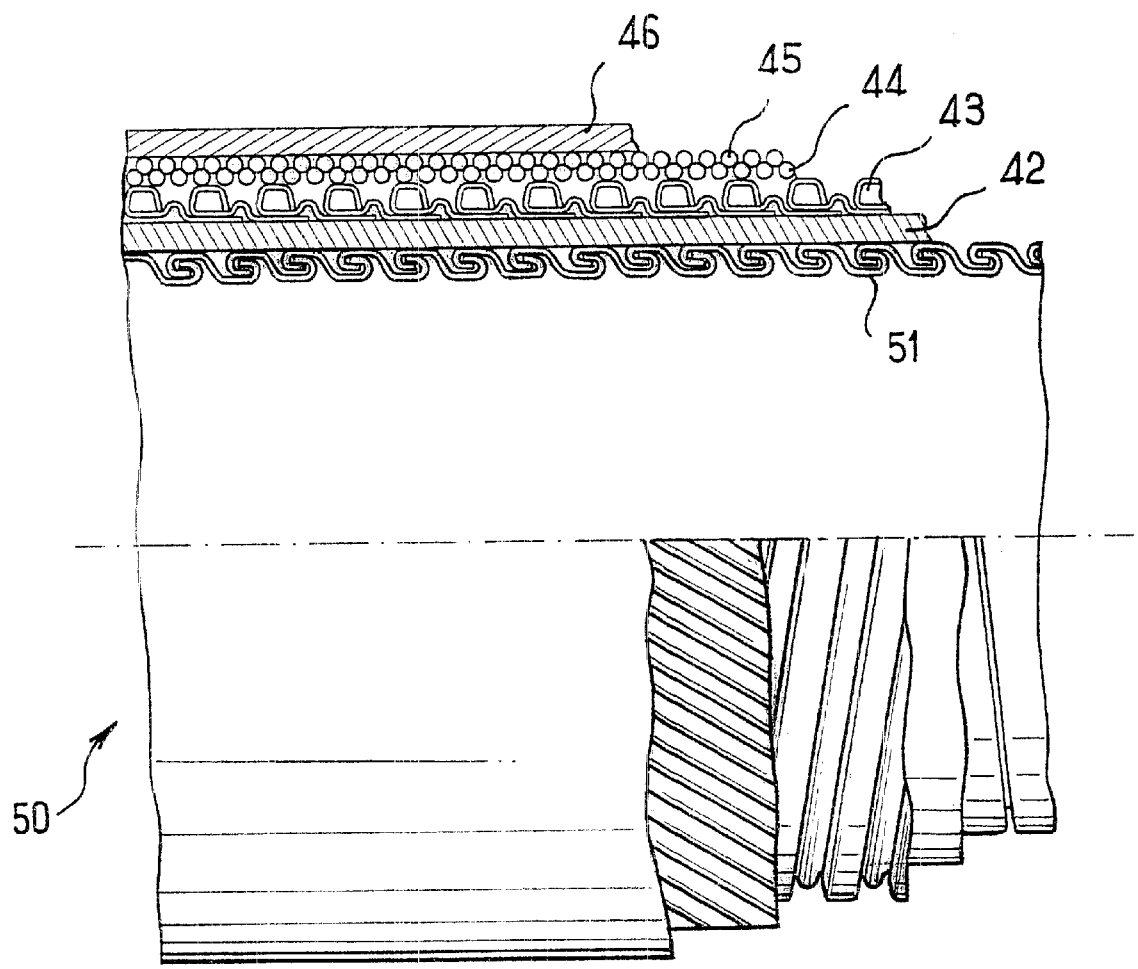
FIG_11

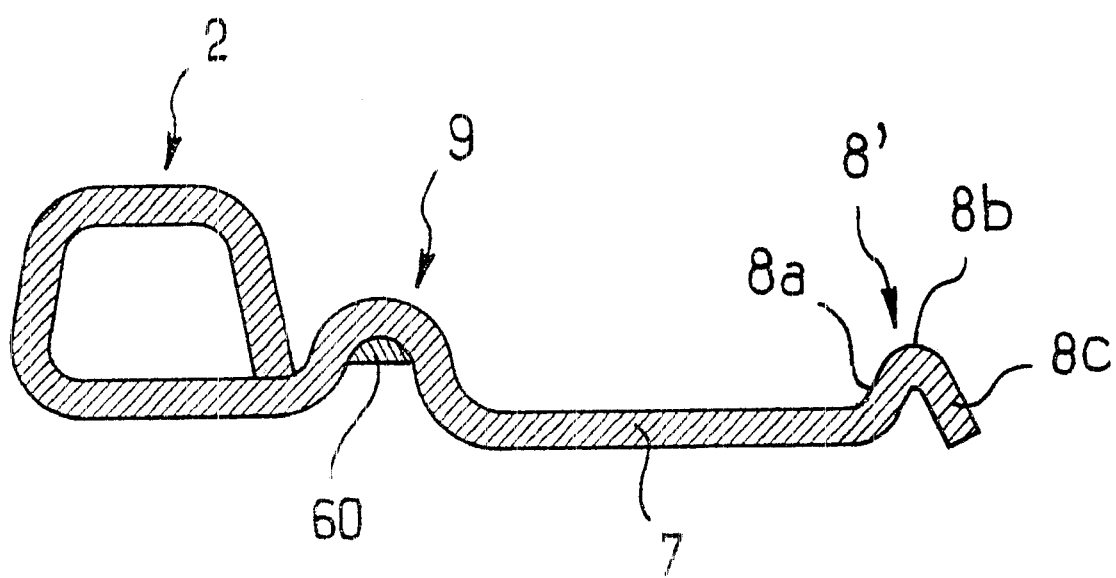
FIG_12

FLEXIBLE METAL TUBE WITH CLOSED SECTION AND FLEXIBLE PIPE COMPRISING SAME

BACKGROUND OF THE INVENTION

The present invention relates to a flexible metal tube having a box element and to a flexible pipe comprising at least one such metal tube.

Coflexip, one of the assignees hereof, has for decades been manufacturing and marketing long flexible pipes of high mechanical strength, which can be used especially for transporting fluids such as hydrocarbons, in particular in sub-sea oil production installations.

Several types of flexible pipes are currently used. A first type of flexible pipe, called a "rough bore", consists of an internal metal carcass, made from a crush-resistant doubly interlocking profiled metal strip, an inner sealing sheath, generally polymeric, at least one armour intended to give the flexible pipe a high-strength to withstand the internal pressure and the axial tension, and an outer sealing sheath, generally polymeric. One or more sealing sheaths, whether polymeric or not, may also be used, for example between armour plies, when the flexible pipe comprises several of them.

Flexible pipes called "smooth bores" are also used and comprise a sealing sheath as the innermost component.

Particularly high-performance doubly interlocking profiled metal strips are especially described in the patent FR 2 654 795 of Nov. 21, 1989 and have been used to produce an internal carcass for a flexible pipe, by making a flat metal tape, such as a stainless steel strip, undergo plastic deformation in order to give it the shape of a doubly interlocking profiled strip, and then by spiralling the profiled strip, that is to say winding it helically with a short pitch with interlocking of the turns of the profiled metal strips. After two consecutive turns have been interlocked, a final plastic deformation of the strip is carried out in order to complete the interlocking.

In Patent FR 2 665 237 it is recommended to produce a tubular metal carcass comprising at least one box element wound in a helix with a short pitch, the said metal carcass being obtained by means of two complementary profiled strips wound helically with a short pitch. Many examples of profiled strips are described and shown in that document, some of which, such as for example those in FIGS. 8 and 9, consisting of a strip in the form of an elongated S and having a box element at a first end and an upwardly curved fastening edge at the other end, the fastening edge penetrating a dish formed by the box element and the transverse bar of the S of the preceding turn. The curved fastening edge may rest on the bottom of the dish (FIG. 9) or it may not be in contact with the said bottom (FIG. 8).

It should be noted that all the cross-sections of the box elements provided at one or both ends i.e. side edges of each profiled strip are squire or rectangular cross-sections.

Although such box-element profiled strips have been satisfactory, they have been found to have certain drawbacks. When one considers that a box element is formed by parts of the same turn of the profiled strip and comprises an upper wall, a lower wall and side walls and when an external force is applied to one of the upper and/or lower walls, such as a compressive or crushing force or else a force generated by the pressurized fluid, buckling of the side walls or faces of the box element then occurs, thereby reducing, at least locally, the crush resistance of the internal carcass.

For forces or pressures exceeding a certain value, buckling of the side walls of the box element occurs.

For lower forces or pressures and when the side walls are not strictly perpendicular to the upper and lower walls of the box element, crushing of the said box element may occur, resulting in the side walls moving further apart or closer together (opening or closing of the box element). To prevent these opening or closing phenomena, it has been recommended in certain cases to weld one end of the box element at one point on the strip. However, such a solution increases the manufacturing cost and it is difficult to implement.

In addition, the relatively large interstices or interjoint spaces, which exist between two consecutive turns or between two adjacent parts of the same turn, such as those which are formed in a dish, promote the creep of the adjacent sealing sheath, this being something which it is desired to avoid as far as possible, mainly in the case of pressure vault.

SUMMARY OF THE INVENTION

The object of the present invention is to remedy the aforementioned drawbacks and to provide a flexible metal tube which can be used in a flexible pipe and which is more suitable for the applications for which it is intended.

The subject of the present invention is a flexible metal tube of longitudinal axis, which comprises at least one strip of approximately constant thickness wound helically about the axis, the strip having at least one closed box element whose walls are formed by portions of the same turn of the strip, the said box element having an upper wall and a lower wall and being provided at one first end i.e. lateral edge of the strip, the other second end i.e. lateral edge of the strip terminating in a free edge, the tube being characterized in that the box element has a trapezoidal cross-section and in that a bulge directed radially towards the upper wall of the box element is provided between the box element and the second free edge of the strip.

The trapezoidal cross-section of the box element makes it possible to have a deformation of the side walls or faces of the box element which is always directed in the same direction, with a tendency to open the box element.

The bulge directed radially towards the upper wall of the box element and provided between the box element and the free edge of the profiled strip has many advantages.

Firstly, the radial bulge or projection blocks the opening of the box element, when opening occurs, thereby stabilizing the geometry of the said box element.

Secondly, penetration of the free edge of the strip into the adjacent radial projection or bulge, of the next consecutive turn of the strip when the free edge is curved towards the upper face of the box element, interlocks two consecutive turns of the helical winding.

Finally, the dimensions and the positioning of the radial bulge on the profiled strip may be chosen so as to considerably limit any creep of a sealing sheath bearing on the said strip.

BRIEF DESCRIPTION OF THE DRAWINGS

Further advantages and features will become apparent from reading the description of several embodiments of the invention and from the appended drawings in which:

FIG. 1 is a sectional view of a first embodiment of a profiled strip used for producing a flexible metal tube according to the invention;

FIG. 2 is a sectional view of several interlocked identical strips, of the type shown in FIG. 1;

FIG. 3 is a sectional view of a second example of a profiled strip used for producing a flexible metal tube according to the invention;

FIG. 4 is a sectional view of several profiled strips joined together, of the type shown in FIG. 3;

FIG. 5 is a sectional view of a third example of a profiled strip used for producing a flexible metal tube according to the invention;

FIG. 6 is a sectional view of several interlocked profiled strips, of the type shown in FIG. 5;

FIG. 7 is a sectional view of a fourth example of a profiled strip used for producing a flexible metal tube according to the invention;

FIG. 8 is a sectional view of several interlocked profiled strips, of the type shown in FIG. 7;

FIG. 9 is a sectional view of several interlocked profiled strips according to a fifth exemplary embodiment of a flexible metal tube according to the invention;

FIG. 10 is an exploded schematic view, partially in longitudinal section, of a flexible pipe comprising an internal carcass and a pressure vault;

FIG. 11 is similar to FIG. 10, but with an internal carcass produced in a conventional manner with an interlocked shaped wire; and FIG. 12 is a sectional view of another example of a profiled strip used for producing a metal tube according to the invention.

DESCRIPTION OF PREFERRED EMBODIMENTS

The flexible metal tube according the present invention is obtained by spiralling or helically winding one of the performed strips shown in FIGS. 1, 3, 5, 7 and 9, the winding being carried out with a small pitch about a longitudinal axis A which coincides with the longitudinal axis of the flexible pipe shown in FIG. 1.

The metal strip 1 shown in FIGS. 1 to 9, consists of a metal strip of constant thickness, for example, equal to 3 mm. The strip 1 is folded, or formed at one end along one longitudinal edge so as to produce a box element 2 of trapezoidal cross-section, which comprises an upper wall 3 constituting the small base of the trapezium, a lower wall 4 constituting the large base of the trapezium and inclined side walls 5 and 6, these various walls being formed by parts of the same turn of the strip. The lower wall 4 is extended by a strip portion 7 which terminates in a free edge 8.

A radial bulge or projection 9 is made between the box element 2 and the free edge 3, by locally deforming part of the said strip portion 7, the direction of deformation being directed towards the upper wall 3 of the box element 2. The projection 9 has a height h which is, measured from the lower face 10 of the strip portion 7, less than the height H of a turn, measured between the face 10 and the external face 11 of the upper wall 3 of the box element 2. The lower face 12 of the wall 4 is offset vertically with respect to the face 10 by a distance equal to the thickness of the strip. Preferably, the height h is between 20 and 80% of the height H of the turn, and preferably between 20 and 40%.

In all the embodiments shown in the various figures, the deformation of the projection 9 is initiated so as to constitute a bearing surface for the end 13 of the adjacent side wall 6 of the box element 2. This bearing surface constitutes a stop, preventing the trapezium from opening when a compressive or crush force is applied either to the upper wall 3 or to the lower wall 4 of the box element 2.

The free edge 8 of the strip portion 7 is curved upwards, as shown in FIGS. 1 and 2, so as to be housed in the projection 9 and to interlock two consecutive turns. Depending on the relative position of the free edge 8 in the projection 9, the interjoint space or interstice between two consecutive turns is relatively large. For the two consecutive turns 14 and 15 in FIG. 2, the free edge 8 lies approximately in the middle of the projection 9, the interjoint space 16 then being approximately equal to one half of the lower opening of the projection 9; for the two consecutive turns 15 and 17, the free edge 8 bears on the left-hand portion 18 of the projection 9, the interjoint space 16 being a maximum space, while in the case of the consecutive turns 17 and 19, the free edge 8 bears on the straight portion 20 of the projection 9 with a minimum interjoint space 16. In the various cases shown, the spacing between the consecutive turns lies between a minimum defined by the respective positions of the turns 15 and 17 and a minimum defined by the respective positions of the turns 17 and 19.

FIG. 3 shows a strip similar to that in FIG. 1, with a projection 9 which has a height h less than or equal to that of the corresponding projection in FIG. 1, but with a free edge which is not curved upwards. The flexible metal tube obtained by joining together the profiled metal strips in FIG. 4 is a non-interlocked tube. The interjoint spaces between the turns in FIG. 4 lie between a maximum space defined by the relative positions of the turns 15' and 17' and a minimum space defined by the respective positions of the turns 17' and 19', the free edge 8 being almost in contact with the portion 20' of the projection 9 of the turn 19', the mean interjoint space being defined by the respective positions of the turns 14' and 15'.

The profiled or preformed strip shown in FIG. 5 comprises a box element 9, the upper wall 3 of which is radially deformed towards the lower wall 4 so as to provide a housing 21, the free edge 8 not being curved upwards. The consecutive turns in FIG. 6 are interlocked by means of a fastener 22 consisting of a windable strip having a cross-section in the form of a C or a U whose approximately vertical arms 23 penetrate the housings 21 of the consecutive turns, the positioning of each arm 23 in the housing 21 of the turns being determined by the relative positions of two consecutive box elements which, in turn, define an interjoint space 16 lying between a maximum space and a minimum space.

The profiled strip shown in FIG. 7 is folded up on itself at one of its ends in such a way that the lower wall 4' of the box element consists of at least one double thickness 24, 25 of the strip, the box element 2 thus formed bearing on the projection 9. The free edge 8 is curved upwards so as to allow interlocking of the consecutive turns, as shown in FIG. 8. Such an additional thickness 24, 25 of the lower face 4' of the box element 2 makes it possible to increase the moment of inertia and consequently to reduce buckling of the side walls, which is reduced to the minimum also because of the double thickness of the side wall 5' on the opposite side from the projection 9. Should it be necessary, it is possible, on the one hand, to provide a non-curved free edge 8 and, on the other hand, to deform the upper wall 3, as shown in FIG. 5, and to ensure interlocking using U-shaped or C-shaped fasteners in the manner shown in FIG. 6. The creep of a sealing sheath depends essentially on the depth or height h of each projection 9, which, in any event, is smaller than in the embodiments shown in FR 2 665 237. It is obvious that the creep may also depend on the space left between the free edge 8 and the projection portion furthest away from the box element.

To improve the anticreep function, it is possible to use a shaped wire 30 which covers the interjoint space 16 between two consecutive turns or else which covers the base of each projection 9, by bearing on the lower faces 10 of two consecutive strip portions 7. The shaped wire 30 may be flat, as shown in the left-hand part of FIG. 9, or may be in the form of an upside-down T, as shown in the right-hand part of FIG. 9, the vertical arm 31 of the T being housed in the corresponding projection 9. The shaped wire 30 may also be a woven anticreep strip as described in the Patent FR 2 744 511.

Alternatively, instead of or as a complement to the shaped wire 30, it is possible to place a flexible or rigid rod (60) in the bottom of the bulge, as shown in FIG. 12.

The flexible metal tube according to the invention can be used in a flexible pipe, either to constitute an internal carcass in the case of a so-called "rough bore" flexible pipe or to constitute a pressure vault in the case of a "smooth bore" flexible pipe, or else in a flexible pipe of the type shown in FIGS. 10 and 11. The flexible pipe 40 shown in FIG. 10 comprises, from the inside outwards, an internal carcass 41 obtained by helically winding profiled or preformed strips according to one of the embodiments shown in FIGS. 1 to 9 with a small pitch, an inner sealing sheath 42, for example of the polymeric type, a pressure vault 43 obtained by helically winding profiled strips according to one of the embodiments shown in FIGS. 1 to 9 with a small pitch, so-called tension armour plies 44, 45 intended to withstand the tensile load, the tension armours being, as is well known to specialists, crossed and wound with a lay angle of less than 55°, and an outer sealing sheath 46, also of the polymeric type. Of course, the internal carcass 41 and the pressure vault 43 may be obtained from identical or different preformed strips.

The flexible pipe 50 shown in FIG. 11 differs from that shown in FIG. 10 by the fact that it comprises a conventional internal carcass 51, made for example from a winding of an interlocked profiled strip of suitable cross-section, such as a cross-section in the form of an elongate S.

In another embodiment, the successive box elements of the turns of the strip consist alternately of inverted trapezia, so that one trapezium having the lower wall as large base alternates with a trapezium having the upper wall as large base.

In another embodiment (FIG. 12), the free edge of the strip could be of the type comprising an upward portion 8a, an intermediate curved portion 8b and a downward portion 8c, so that the free edge has a kind of bulge 8' which is housed in the bulge 9 of the consecutive turn of the adjacent strip.

What is claimed is:

1. A flexible metal tube having a longitudinal axis, the tube comprising at least one strip of approximately constant thickness wound helically in turns about the axis, the strip having opposite first and second edges, the strip having at least one closed box element extending along the length of the strip and along the first edge, the box element having walls formed by portions of the same turn of the strip, the walls including an upper wall and a lower wall, the other second edge of the strip terminating in a free edge, the box element having a trapezoidal cross-section;

a radial bulge directed radially towards the upper wall of the box element and located between the box element and the second free edge of the strip; and the turns of the strip are wound so that the free second edge of the strip in each turn is curved and is housed in the radial bulge of the adjacent turn of the strip.

2. Flexible metal tube according to claim 1, wherein the radial bulge has a height which is less than the height of a turn of the strip.

3. Flexible metal tube according to claim 2, wherein the height of the radial bulge is between 20% and 80% of the height of the turn of the strip.

4. Flexible metal tube according to claim 1, wherein the curved free edge bears on a portion of the radial bulge which is closest to the box element.

5. Flexible metal tube according to claim 1, wherein the curved free edge bears on a portion of the radial bulge which is furthest away from the box element.

6. Flexible metal tube according to claim 1, wherein at least part of the upper wall of the box element is deformed radially towards the lower wall, two consecutive box elements each provided on a respective turn of the strip being interlocked at their deformed upper walls.

7. Flexible metal tube according to claim 1, wherein at the box element the strip is folded in such a way that the lower wall is comprised of at least a double thickness of the strip.

8. Flexible metal tube according to claim 1, wherein there are interjoint spaces between consecutive turns of the tube and a shaped wire covers the interjoint spaces between the turns of the said tube.

9. Flexible metal tube according to claim 1, wherein there are interjoint spaces between consecutive turns of the tube and a shaped wire covers the interjoint spaces between the turns of the said tube: and the shaped wire is flat.

10. Flexible metal tube according to claim 1, further comprising the bulge having a bottom toward the upper wall of the box element, and a rod extending along and resting on the bottom of the bulge.

11. A flexible tubular pipe, including at least one pressure vault comprised of the flexible metal tube according to claim 1.

12. A flexible tubular pipe, including at least one internal carcass comprised of the flexible metal tube according to claim 1.

13. A flexible tubular pipe comprising, from inside outwards, a crush-resistant internal metal carcass, an inner sealing sheath, a pressure vault able to withstand internal pressure generated by flow of a pressurized fluid in the flexible pipe, at least one tension armor and an outer sealing sheath, and at least the pressure vault is comprised of the flexible metal tube according to claim 1.

14. Flexible tubular pipe according to claim 13 wherein each of the internal carcass and the pressure vault is comprised of the flexible metal tube and the tube comprises at least one strip of approximately constant thickness wound helically about the axis, the strip having at least one closed box element having walls formed by portions of the same turn of the strip, the box element having an upper wall and a lower wall and being provided at one end of the strip, the other end of the strip terminating in a free edge, the box element has a trapezoidal cross-section and a bulge directed radially towards the upper wall of the box element between the box element and the free edge of the strip.

15. Flexible tubular pipe according to claim 13, further comprising a U-shaped or C-shaped profile interlocking the box shaped elements in successive turns.

16. A flexible metal tube having a longitudinal axis, the tube comprising at least one strip of approximately constant thickness wound helically in turns about the axis, the strip having opposite first and second edges.

the strip having at least one closed box element extending along the length of the strip and along the first edge, the box element having walls formed by portions of the same turn of the strip, the walls including an upper wall and a lower wall, the other second edge of the strip terminating in a free edge, the box element having a trapezoidal cross-section;

a radial bulge directed radially towards the upper wall of the box element and located between the box element and the second free edge of the strip; and the box element has a wall adjacent to the radial bulge; the wall having a base that bears on the radial bulge.

17. A flexible metal tube having a longitudinal axis, the tube comprising at least one strip of approximately constant thickness wound helically in turns about the axis, the strip having opposite first and second edges, the strip having at least one closed box element extending along the length of the strip and along the first edge, the box element having walls formed by portions of the same turn of the strip, the walls including an upper wall and a lower wall, the other second edge of the strip terminating in a free edge, the box element having a trapezoidal cross-section;

a radial bulge directed radially towards the upper wall of the box element and located between the box element and the second free edge of the strip wherein there are interjoint spaces between consecutive turns of the tube and a shaped wire covers the interjoint spaces between the turns of the said tube; and the shaped wire has a cross-section in the form of an inverted T, including a vertical arm of the T which extends in a corresponding one of the radial bulges.

18. Flexible metal tube wherein having a longitudinal axis, the tube comprising at least one strip of approximately constant thickness wound helically in turns about the axis, the strip having opposite first and second edges, the strip having at least one closed box element extending along the length of the strip and along the first edge, the box element having walls formed by portions of the same turn of the strip, the walls including an upper wall and a lower wall, the other second edge of the strip terminating in a free edge, the box element having a trapezoidal cross-section;

a radial bulge directed radially towards the upper wall of the box element and located between the box element and the second free edge of the strip; and the second free edge of the strip comprises a second bulge shaped and placed for being inserted into the bulge adjacent to the box element of the adjacent turn of the strip.

19. A flexible metal tube having a longitudinal axis, the tube comprising at least one strip of approximately constant thickness wound helically in turns about the axis, the strip having opposite first and second edges.

the strip having at least one closed box element extending along the length of the strip and along the first edge, the box element having walls formed by portions of the same turn of the strip, the walls including an upper wall and a lower wall, the other second edge of the strip terminating in a free edge, the box element having a trapezoidal cross-section;

a radial bulge directed radially towards the upper wall of the box element and located between the box element and the second free edge of the strip;

there are interjoint spaces between consecutive turns of the tube and a shaped wire covers the interjoint spaces between the turns of the said tube; and the interjoint spaces are below the bulge and are there covered by the shaped wire.

20. A flexible metal tube having a longitudinal axis, the tube comprising at least one strip of approximately constant thickness wound helically in turns about the axis, the strip having opposite first and second edges.

the strip having at least one closed box element extending along the length of the strip and along the first edge, the box element having walls formed by portions of the same turn of the strip, the walls including an upper wall and a lower wall, the other second edge of the strip terminating in a free edge, the box element having a trapezoidal cross-section;

a radial bulge directed radially towards the upper wall of the box element and located between the box element and the second free edge of the strip;

the radial bulge has a height which is less than the height of a turn of the strip; and the lower wall of the box element is at a greater radial height above the turn of strip in a region across the strip between the edges than the height of the strip beyond the bulge toward the second edge.

* * * * *